March 22, 1932.  T. HALL  1,850,103
COMBINED SPOT AND FLOOD LIGHT
Filed March 6, 1929   2 Sheets-Sheet 1
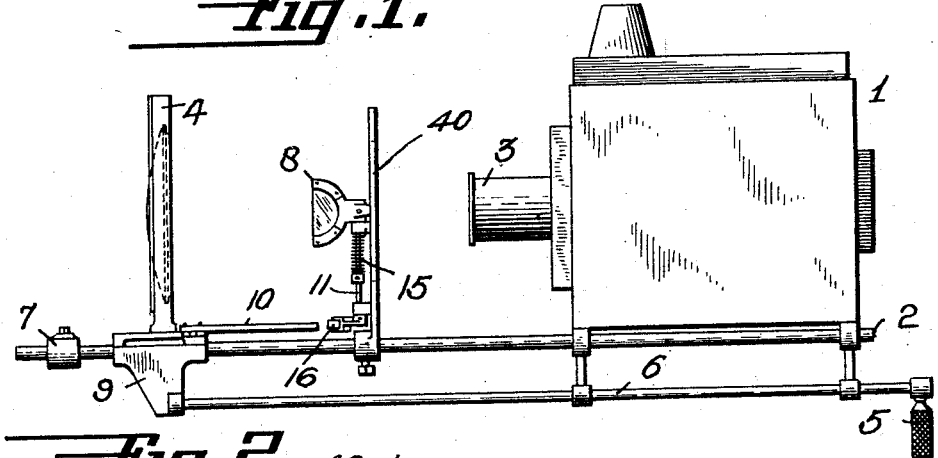
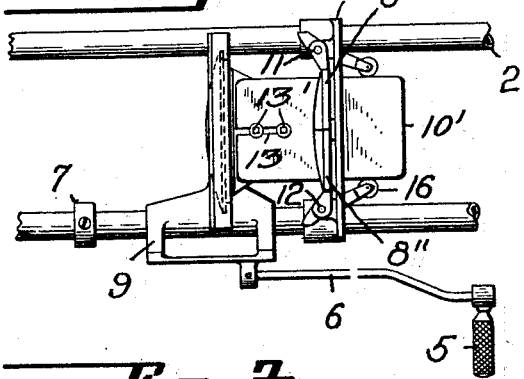
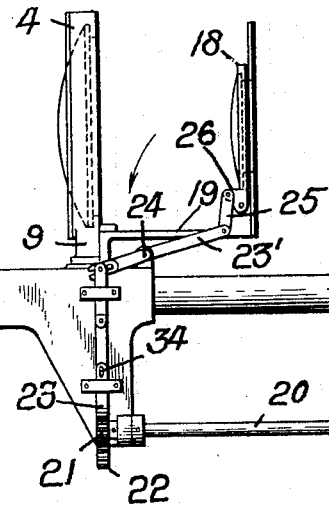
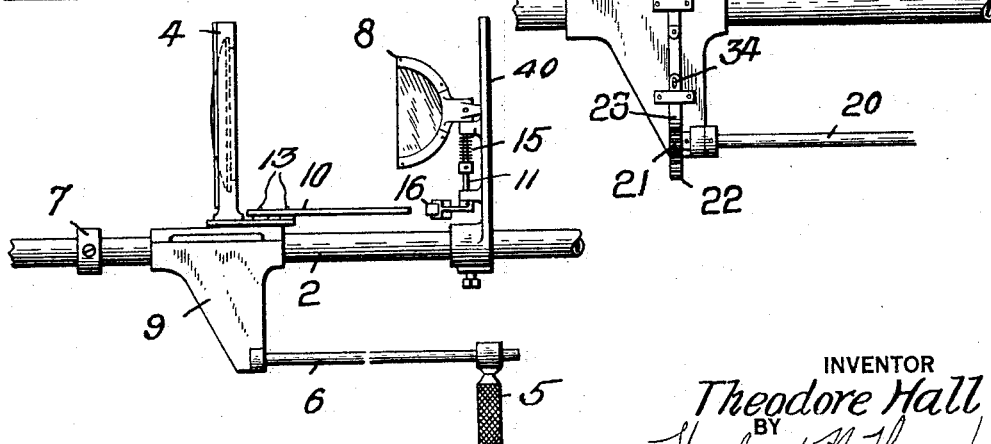
INVENTOR
Theodore Hall
BY
Herbert H Thompson
his ATTORNEY.

March 22, 1932. T. HALL 1,850,103
COMBINED SPOT AND FLOOD LIGHT
Filed March 6, 1929   2 Sheets-Sheet 2
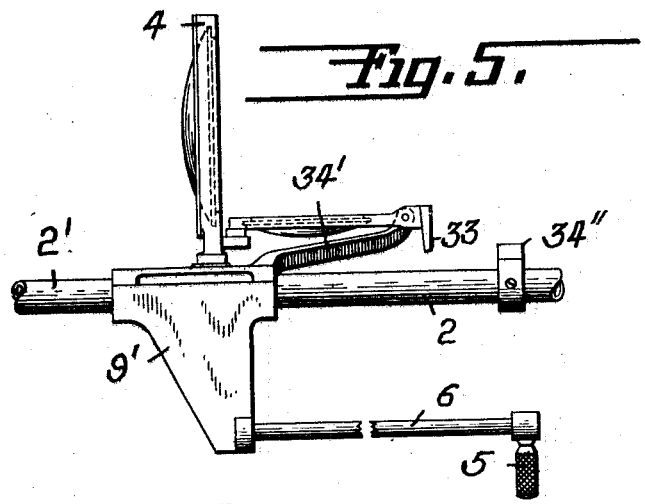
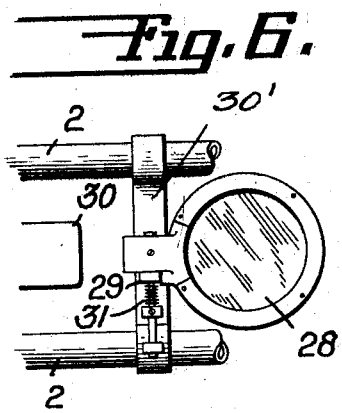
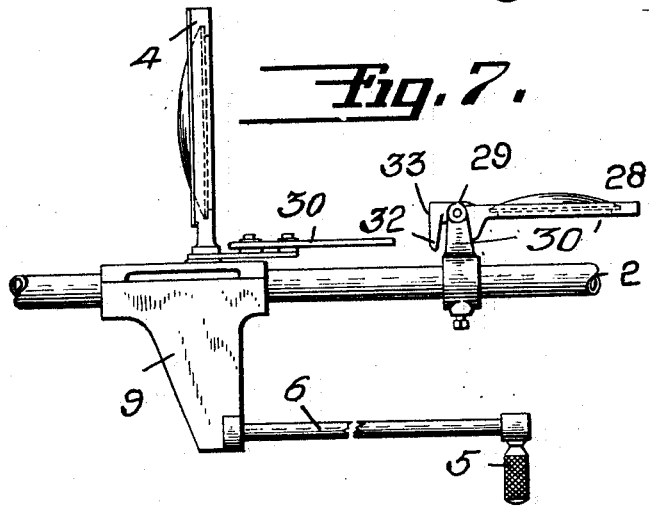
INVENTOR
Theodore Hall
BY
Herbert H. Thompson
his ATTORNEY Patented Mar. 22, 1932

1,850,103

UNITED STATES PATENT OFFICE

THEODORE HALL, OF NEW YORK, N. Y., ASSIGNOR TO HALL & CONNOLLY, INC., OF NEW YORK, N. Y., A CORPORATION OF NEW YORK

COMBINED SPOT AND FLOOD LIGHT

Application filed March 6, 1929. Serial No. 344,701.

This invention relates to projector or spot-lights particularly adapted for illuminating the stage in theaters, public halls and the like. In such apparatus it is frequently desirable to vary the spread of the beam so as to change the light from a spot-light into a flood-light with a variable angle of spread. To such end, it is usual to provide means for relatively adjusting the source of light and the objective lens. By such means, however, only a limited amount of variation in the spread of the beam can be obtained and this invention relates to means for providing an additional range of variation without causing transitory "flashing" or dispersion of the beam which is objectionable. To this end, I provide an auxiliary lens which I introduce preferably between the objective and the source of light. Said lens is preferably introduced in such a manner as to cause a change in the spread of the beam to take place smoothly and with a minimum amount of flashing as the lens comes in.

Referring to the drawings in which several preferred embodiments of the invention are shown, Fig. 1 is a side elevation showing the lamp housing, objective lens, and my improved removable spread lens between the same.

Fig. 2 is a plan view of the objective and auxiliary lenses, the parts being positioned differently than in Fig. 1.

Fig. 3 is a side view of the same with the parts separated and the auxiliary lens out of position.

Fig. 4 is a side elevation showing a modified form of auxiliary lens.

Fig. 5 is a side elevation of still another form of auxiliary lens mounting.

Fig. 6 is a plan view of still another modification.

Fig. 7 is a side elevation of the form of lenses shown in Fig. 6.

In Fig. 1 the housing for the source of light is shown at 1. Said source may be of any suitable form, but is preferably a high intensity arc light. The housing is shown as mounted on suitable supporting rods 2, the light emerging through the usual lens system 3. Adjustably mounted on said support 2 is the objective lens 4, which is shown connected to the adjusting handle 5 by rod 6. A suitable stop 7 is shown for limiting the outward movement of the lens, in which position the beam is in the form of a spot-light. To spread the beam the operator moves the handle 5 to the right in Fig. 1. As the lens moves slightly beyond the position shown in Fig. 1, it nears the range of spread possible with a single lens so that I provide means for moving an auxiliary lens 8 into the beam as the lens 4 is moved further toward the source of light. For this purpose I have shown the carriage 9 which supports lens 4 as provided with a cam plate 10. Said plate is shown as adjustably mounted on the carriage 9 as by set-screws 13' passing through slot 13 in said plate. In this form of the invention lens 8 is shown as a split lens, that is, it is divided vertically into two halves 8' and 8", which are separately pivoted on rods 11 and 12 on opposite sides of the beam. As shown, the lenses are pivoted on a hollow framework 40 which in turn is adjustably mounted on the guide rods 2. The two halves are normally maintained opened, that is, in the position shown in Figs. 1 and 3, by coil springs 15. The pivot rods 11 and 12 are shown as provided at the lower ends with cam rollers 16. Said rollers normally project in the path of plate 10 so that as said plate is moved to the right in Figs. 1 and 3 the front edge 10' thereof first engages the rollers and rotates them inwardly until finally the edge 10' pushes past the rollers and the rollers engage the side edges of the plate as shown in Fig. 2. This construction causes the lenses to close quickly as the plate reaches the rollers and to remain closed during the subsequent adjustment of the lens 4 for further variations of the beam spread. Since the cam plate 10 has straight side edges the lens 4 can be focused without drawing the lens 8 out of position. When, however, the lens 4 is again returned to the position in Figs. 1 and 3, the two halves of the lens 8 are thrown out of the beam quickly by the coil springs 15 without causing flashing of the beam.

In the modification according to Fig. 4 the auxiliary lens 18 is shown as mounted on an arm 19 secured to the base 9 of lens 4 so that the distance between the two lenses remains fixed. In this case the auxiliary lens is thrown into and out of position by rotating the shaft 20. Said shaft is shown as provided with a pinion 21 in connection with rack teeth 22 on a link 23. Said link is shown as connected to a lever 23' pivoted at 24 and connected through link 25 to an ear 26 on said lens 18. It will readily be seen that as the shaft 20 is rotated the lens 18 may be revolved counter-clockwise in Fig. 4 to a position without the beam or thrown quickly into position in the beam, as desired. A stop pin 34 may be provided to limit the throw of the links and lens.

In Figs. 6 and 7 the auxiliary lens is again operated by a cam plate 30, secured to the main lens 4. In this instance, however, the auxiliary lens 28 is made in one piece and is pivoted at 29 on bracket 30' adjustably secured to support 2. Said lens is normally maintained in the position shown in Figs. 6 and 7 by coil spring 31, but is revolved to an upright position when the plate 30 strikes the downwardly projecting ear 32 on said lens, as will be readily apparent and is maintained in this position as long as plate 30 lies under the flat surface 33 on said ear 32.

In Fig. 5 still another form is shown. In this form, as in Fig. 4, the lens is pivotally secured to the base 9' of lens 4 as by being pivoted on an arm 34' extending therefrom. Said lens is normally maintained in the position shown in Fig. 5 by a coil spring, not shown, and is revolved to and maintained in an upright position when the downwardly projecting ear 32 thereon strikes the adjustable stop 34'' on the rod 2.

From the foregoing, the operation of my invention will be readily apparent. The auxiliary lens in all forms of the invention is entirely out of beam when the beam is in the form of a spotlight or moderately spread. As, however, the spread of the beam is increased by the adjustment of the objective lens, the auxiliary lens is automatically brought into the beam at the proper point and without causing flashing of the beam, the auxiliary lens being maintained in this position during subsequent focusing and adjustments of the beam as long as a wide angle spread is desired. On the other hand, as the spread of the beam is decreased, the auxiliary lens is automatically thrown out of the beam as explained.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a spot-light projector, the combination with the source of light and objective lens, of means for relatively adjusting said source and lens to vary the spread of the beam, an auxiliary lens normally without the beam, and automatic means for moving it into the beam during the adjustment of said source and lens to increase the spread without transitory dispersion.

2. In a spot-light projector, the combination with the source of light and objective lens, of means for relatively adjusting said source and lens to vary the spread of the beam, an auxiliary lens normally without the beam, and means brought into action when said adjustment has reached a predetermined point for moving it into the beam to increase the spread.

3. In a spot-light projector, the combination with the source of light and objective lens, of means for relatively adjusting said source and lens to vary the spread of the beam, a split auxiliary lens, means for pivoting each half thereof on a pivot lying without and to either side of the beam and extending substantially parallel to the plane of the lens, and means for opening and closing said lens to vary the beam spread.

4. In a spot-light projector, the combination with the source of light and objective lens, of means for relatively adjusting said source and lens to vary the spread of the beam, a split auxiliary lens, means for pivoting each half thereof to either side of the beam, and means brought into action when said adjustment has reached a predetermined point for opening and closing said lens to vary the beam spread.

5. In a spot-light projector, the combination with the source of light and objective lens, of means for relatively adjusting said source and lens to vary the spread of the beam, an auxiliary lens normally without the beam, means brought into action when said adjustment has reached a predetermined point for moving it into the beam to increase the spread, and means for maintaining said lens in the beam during subsequent further adjustment of the beam spread.

6. In a spot-light projector, the combination with the source of light and objective lens, of means for relatively adjusting said source and lens to vary the spread of the beam, an auxiliary lens normally without the beam, and a cam carried by said objective lens for rotating said auxiliary lens to and maintaining it in a position within the beam.

7. In a spot-light projector, the combination with the source of light and objective lens, of means for relatively adjusting said source and lens to vary the spread of the beam, a split auxiliary lens, means for pivoting each half thereof to either side of the beam, a cam plate having straight sides carried by said objective lens, and arms on said split lens extending in the path of said plate whereby both halves of said split lens are simultaneously closed and maintained closed as the objective lens moves toward said split lens.

In testimony whereof I have affixed my signature.

THEODORE HALL.